US012808489B2

(12) United States Patent
Piltz et al.

(10) Patent No.: US 12,808,489 B2
(45) Date of Patent: Nov. 24, 2026

(54) SUPPLY CONTROL SYSTEM FOR A PLURALITY OF TANKS

(71) Applicant: VERSUM MATERIALS US, LLC, Tempe, AZ (US)

(72) Inventors: Thomas William Piltz, New Tripoli, PA (US); Cynthia Lee Hughes, Alburtis, PA (US); John Paul Prego, Tempe, AZ (US); Shawn S. Cable, Tempe, AZ (US); Sang-Jae Yim, Jeju-do (KR); Anthony John Smith, New Tripoli, PA (US); Jihoon Kim, Gyeonggi-Do (KR); Sang-Keun Lee, Gyeonggi-Do (KR); Yong-Tae Kim, Gyeonggi-Do (KR); Tae-Ug Kang, Gyeonggi-Do (KR); Ho-San Kwon, Gyeonggi-Do (KR); Sung-Up Jang, Gyeonggi-Do (KR); Young-Soo Choi, Gyeonggi-Do (KR); Hyo-Jong Hwang, Gyeonggi-Do (KR); Bang-Yeon Yu, Gyeonggi-Do (KR)

(73) Assignee: Versum Materials US, LLC, Tempe, AZ (US)

( * ) Notice: Subject to any disclaimer, the term of this patent is extended or adjusted under 35 U.S.C. 154(b) by 222 days.

(21) Appl. No.: 18/245,341

(22) PCT Filed: Sep. 16, 2021

(86) PCT No.: PCT/US2021/050737

§ 371 (c)(1),
(2) Date: Mar. 14, 2023

(87) PCT Pub. No.: WO2022/061029

PCT Pub. Date: Mar. 24, 2022

(65) Prior Publication Data

US 2023/0408034 A1 Dec. 21, 2023

Related U.S. Application Data

(60) Provisional application No. 63/080,282, filed on Sep. 18, 2020.

(30) Foreign Application Priority Data

Sep. 18, 2020 (KR) ........................ 10-2020-0120450

(51) Int. Cl.
*F17C 5/06* (2006.01)

(52) U.S. Cl.
CPC ........ *F17C 5/06* (2013.01); *F17C 2205/0134* (2013.01); *F17C 2205/0338* (2013.01);
(Continued)

(58) Field of Classification Search
CPC ...... F17C 2270/0518; F17C 2250/0626; F17C 2250/0636
See application file for complete search history.

(56) References Cited

U.S. PATENT DOCUMENTS 6,042,649 A 3/2000 Song et al.
6,583,049 B2 6/2003 Suzuki et al.
(Continued)

FOREIGN PATENT DOCUMENTS

CN 100485871 C 5/2009
CN 103644456 A 3/2014
(Continued)

OTHER PUBLICATIONS

Translation of JP 6150839 (Year: 2017).*
(Continued)

*Primary Examiner* — Jason K Niesz
(74) *Attorney, Agent, or Firm* — Versum Materials US, LLC; Daniel A. DeMarab, Jr.

(57) ABSTRACT

A supply control system for a tank utilized in a semiconductor manufacturing process is disclosed. The supply con-
(Continued)

trol system for the tank according to an embodiment of the present disclosure includes a plurality of tanks for storing a large amount of process material used to manufacture a semiconductor; a main-supply pipe configured to communicate with sub-supply pipes respectively coupled to the plurality of tanks and to supply process material to a semiconductor manufacturing device; a plurality of flow control devices respectively included in the sub-supply pipes and configured to control a process material flow rate discharged from each of the plurality of tanks; a sensor included in the main-supply pipe and configured to measure in real time the process material flow rate and a process material supply pressure supplied from each of the plurality of tanks to the semiconductor manufacturing device; a back-up portion coupled to the main-supply pipe and configured to supplementally discharge stored process material, such that process material is stably supplied to the semiconductor manufacturing device; and a controller configured to control the plurality of flow control devices and the back-up portion based on information on the process material flow rate or information on the process material supply pressure measured by the sensor, such that a set process material flow rate is supplied to the semiconductor manufacturing device through the main-supply pipe.

5 Claims, 5 Drawing Sheets

(52) U.S. Cl.
CPC ................. *F17C 2250/0626* (2013.01); *F17C 2270/0518* (2013.01)

(56) References Cited

U.S. PATENT DOCUMENTS

| | | | | |
|---|---|---|---|---|
| 8,137,764 | B2 | 3/2012 | Vincent et al. | |
| 9,922,818 | B2 | 3/2018 | Vrtis et al. | |
| 10,562,151 | B2 | 2/2020 | Byers et al. | |
| 2002/0142579 | A1 | 10/2002 | Vincent et al. | |
| 2003/0232137 | A1 | 12/2003 | Vrtis et al. | |
| 2004/0197474 | A1 | 10/2004 | Vrtis et al. | |
| 2005/0109399 | A1 * | 5/2005 | Wodjenski | F17C 13/04 137/240 |
| 2006/0000358 | A1 * | 1/2006 | Agrawal | F17C 9/00 95/273 |
| 2006/0078676 | A1 | 4/2006 | Lukas et al. | |
| 2007/0261735 | A1 | 11/2007 | Yasumuro | |
| 2008/0268177 | A1 | 10/2008 | Vrtis et al. | |
| 2010/0137626 | A1 | 6/2010 | Hamada | |
| 2011/0111318 | A1 | 5/2011 | Bernard et al. | |
| 2011/0206857 | A1 | 8/2011 | Yim et al. | |
| 2011/0313184 | A1 | 12/2011 | Tajima et al. | |
| 2012/0241088 | A1 | 9/2012 | Akiyoshi | |
| 2013/0060061 | A1 | 3/2013 | Mayorga et al. | |
| 2013/0260575 | A1 | 10/2013 | Al-Rashid et al. | |
| 2015/0368803 | A1 | 12/2015 | Yim et al. | |
| 2015/0380265 | A1 | 12/2015 | Yim et al. | |
| 2016/0049293 | A1 | 2/2016 | Li et al. | |
| 2019/0134663 | A1 | 5/2019 | Lei et al. | |
| 2019/0244810 | A1 | 8/2019 | Vrtis et al. | |
| 2020/0208783 | A1 | 7/2020 | Lim et al. | |

FOREIGN PATENT DOCUMENTS

| | | | |
|---|---|---|---|
| JP | 2007-170443 | A | 7/2007 |
| JP | 2013-130218 | A | 7/2013 |
| JP | 6150839 | B2 | 6/2017 |
| KR | 10-2005-0071045 | A | 10/2008 |
| KR | 20-2009-0005172 | U | 5/2009 |
| KR | 10-0970833 | B1 | 7/2010 |
| TW | 201239127 | A | 10/2012 |
| TW | I723204 | B | 4/2021 |
| WO | 2016/144960 | A1 | 9/2016 |
| WO | 2022/061029 | A1 | 3/2022 |

OTHER PUBLICATIONS

Translation of JP 2013 130218 (Year: 2013).*

"Extended European Search Report received for European Patent Application No. 21870243.9, mailing date Jul. 11, 2024", 06 Pages.

Baklanov, et al., "Plasma processing of low-k dielectrics", Journal of Applied Physics, vol. 113, No. 4, Jan. 28, 2013, p. 041101-1 - 041101-41.

Grill, et al., "PECVD low and ultralow dielectric constant materials: From invention and research to products", Journal of Vacuum Science and Technology B: Nanotechnology and Microelectronics, vol. 34, Issue 2, Mar. 2016, p. 020801-1 - 020801-4.

"International Preliminary Report on Patentability received for PCT Application No. PCT/US2021/050737, mailing date Mar. 30, 2023", 06 Pages.

"International Search Report and Written Opinion received for PCT Application No. PCT/US2021/050737, mailing date Dec 21, 2021", 07 Pages.

Priyadarshini, et al., "Advanced single precursor based pSiCOH k=2.4 for ULSI interconnects", Journal Vacuum Science of Technology, vol. 35, No. 2, Mar. 2017, pp. 021201-021201-6.

* cited by examiner

SUPPLY CONTROL SYSTEM FOR A PLURALITY OF TANKS

CROSS-REFERENCE TO RELATED APPLICATIONS

This application is a National Stage filing under 35 U.S.C. 371 of International Patent Application No. PCT/US2021/050737, filed Sep. 16, 2021, which claims benefit of priority to U.S. Provisional Patent Application 63/080,282 filed on Sep. 18, 2020, entitled "Supply Control System for an ISO Tank," and Korean Patent Application 10-2020-0120450 filed on Sep. 18, 2020, entitled "Supply Control System for an ISO Tank". The entirety of each application are incorporated herein by reference.

BACKGROUND

1. Technical Field

The present disclosure relates to a supply control system for a plurality of tanks, wherein such plurality of tanks is configured such that process material is stably supplied to a semiconductor manufacturing device from a plurality of tanks for storing process material used to manufacture a semiconductor.

2. Background

Process material supply systems that are currently installed in semiconductor manufacturing plants are generally configured to couple the plurality of tanks to a semiconductor manufacturing device through only one supply line. There are disadvantages in that it is difficult to individually control the plurality of tanks so as to adjust the discharged amount of the chemical products supplied to the semiconductor manufacturing device, and process material is supplied only through a specific tank.

In addition, in the case of the above, when the periodic management of a plurality of tanks is not integrated and systematic, there is a disadvantage in that it is difficult for the operator to accurately recognize when the stored process materials are exhausted and to arbitrarily adjust the time when any tank has to be replaced.

Accordingly, when several tanks have to be replaced at the same time due to the simultaneous occurrence of these disadvantages, the entire manufacturing line may be stopped even though the continuous supply of the chemical products is important in the semiconductor manufacturing process.

SUMMARY

The present disclosure is directed to providing a supply control system for a process material delivery system in which, with respect to a plurality of tanks installed to supply process material used to manufacture a semiconductor to a semiconductor manufacturing device, a process material flow rate discharged from each of a plurality of tanks can be controlled, a replacement cycle of each of the plurality of tanks can be efficiently managed by checking and controlling a remaining amount of process material, and a fixed amount of process material required for the semiconductor manufacturing device can be stably supplied to the semiconductor manufacturing device even if a specific tank is replaced or an abnormality occurs in a pipe.

This can be achieved by a supply control system for a tank according to an embodiment of the present disclosure, including a plurality of tanks for storing process materials used to manufacture a semiconductor; a main-supply pipe configured to communicate with sub-supply pipes respectively coupled to the plurality of tanks and to supply process materials to a semiconductor manufacturing device; a plurality of flow control devices respectively included in the sub-supply pipes and configured to control a process material flow rate discharged from each of the plurality of tanks; a sensor included in the main-supply pipe and configured to measure in real time a process material flow rate and a process material supply pressure supplied from each of the plurality of tanks to the semiconductor manufacturing device; a back-up portion coupled to the main-supply pipe and configured to supplementally discharge the stored process material, such that process material is stably supplied to the semiconductor manufacturing device; and a controller configured to control the plurality of flow control devices and the back-up portion based on information on the process material flow rate or information on the process material supply pressure measured by the sensor, such that a set process material flow rate is supplied to the semiconductor manufacturing device through the main-supply pipe.

The controller may be configured to control the plurality of flow control devices to operate at different opening rates, such that process material stored in the plurality of tanks is discharged from each of the plurality of tanks at a different flow ratio and the plurality of tanks are exhausted sequentially.

The plurality of tanks and the back-up portion may include at least one of a load cell or a pressure sensor to estimate the remaining amount of stored process material, the load cell being configured to measure the weight of each of the plurality of tanks and the back-up portion that changes according to discharging of stored process material, and the pressure sensor being configured to measure the internal pressure of each of the plurality of tanks and the back-up portion that changes according to discharging of stored process material.

The controller may be configured to control the back-up portion to supplementally supply process material when there is an abnormality in the information on the process material flow rate and the information on the process material supply pressure measured by the sensor.

The controller may be configured to control an operation of the back-up portion to supplementally supply process material while a specific one of the plurality of tanks is being replaced according to sequential process material exhaustion of the plurality of tanks.

When the plurality of tanks comprises a first tank, a second tank, a third tank, and a fourth tank, the controller may be configured to control, based on the process material flow rate set to be supplied to the semiconductor manufacturing device through the main-supply pipe, each of the plurality of flow control devices such that the first, second, third, and fourth tanks discharge 40%, 30%, 20%, and 10% of process material flow rate, respectively.

The controller may be configured to control, based on the process material flow rate set to be supplied to the semiconductor manufacturing device through the main-supply pipe, each of the plurality of flow control devices such that the first, second, third, and fourth tanks discharge 10%, 40%, 30%, and 20% of process material flow rate, respectively, when the replacement of the first tank is completed according to the exhaustion of process material stored in the first tank.

According to the supply control system for the tank according to the embodiments of the present disclosure, since the plurality of flow control device included in the sub-supply pipes and configured to control the process material flow rate discharged from each of the plurality of tanks for storing process material used to manufacture the semiconductor, and the back-up portion coupled to the main-supply pipe and configured to supplementally discharge process material to stably supply process material, can be controlled by the controller based on the process material flow rate and the process material supply pressure measured in real time by the sensor of the main-supply pipe, respectively, the remaining amount of process material for each of the plurality of tanks can be checked and controlled, the replacement cycle of each of the plurality of tanks can be efficiently managed, and even if any one of the plurality of tanks is replaced or an abnormality occurs in the pipe, a fixed amount of process material required for the semiconductor manufacturing device can be stably supplied.

DETAILED DESCRIPTION

Hereinafter, the preferable embodiments of the present disclosure will be described in detail with reference to the accompanying drawings. The detailed description of related known technology will be omitted when it may obscure the subject matter of the embodiments according to the present disclosure.

For sake of clarity, objects referred to previously or hereafter as a 'tank' may encompass any enclosed vessel constructed of stainless steel, Cr—Mo steel alloys such as Alloy 4130, nickel, aluminum, or other suitable materials which can sustain pressures ranging from 0 Torr to >3000 psig. The internal volume of the tank may range from less than 1 liter to 22500 liters or more.

Also for sake of clarity, anything referred to previously or hereafter as a 'process material' may be any materials that is used in the manufacture of semiconductors. That may include materials which are either stored in or delivered in the phase of matter of a solid, liquid, gas, liquefied compressed gas, or supercritical fluid.

Finally, and for sake of clarity, components referred to previously or hereafter as a 'flow control device' may encompass any means of varying the volume or pressure of a process material flowing through or out of a process material delivery system used in the manufacture of semiconductors. These components may include mass flow controllers, proportional control valves, pressure control valves (regulators), restrictive flow orifices, and pneumatically actuated valves. The flow rates being controlled may range from 0 liters per minute to greater than 2000 liters per minute. The pressure may range from 0 Torr to >3000 psig.

Figure 1:
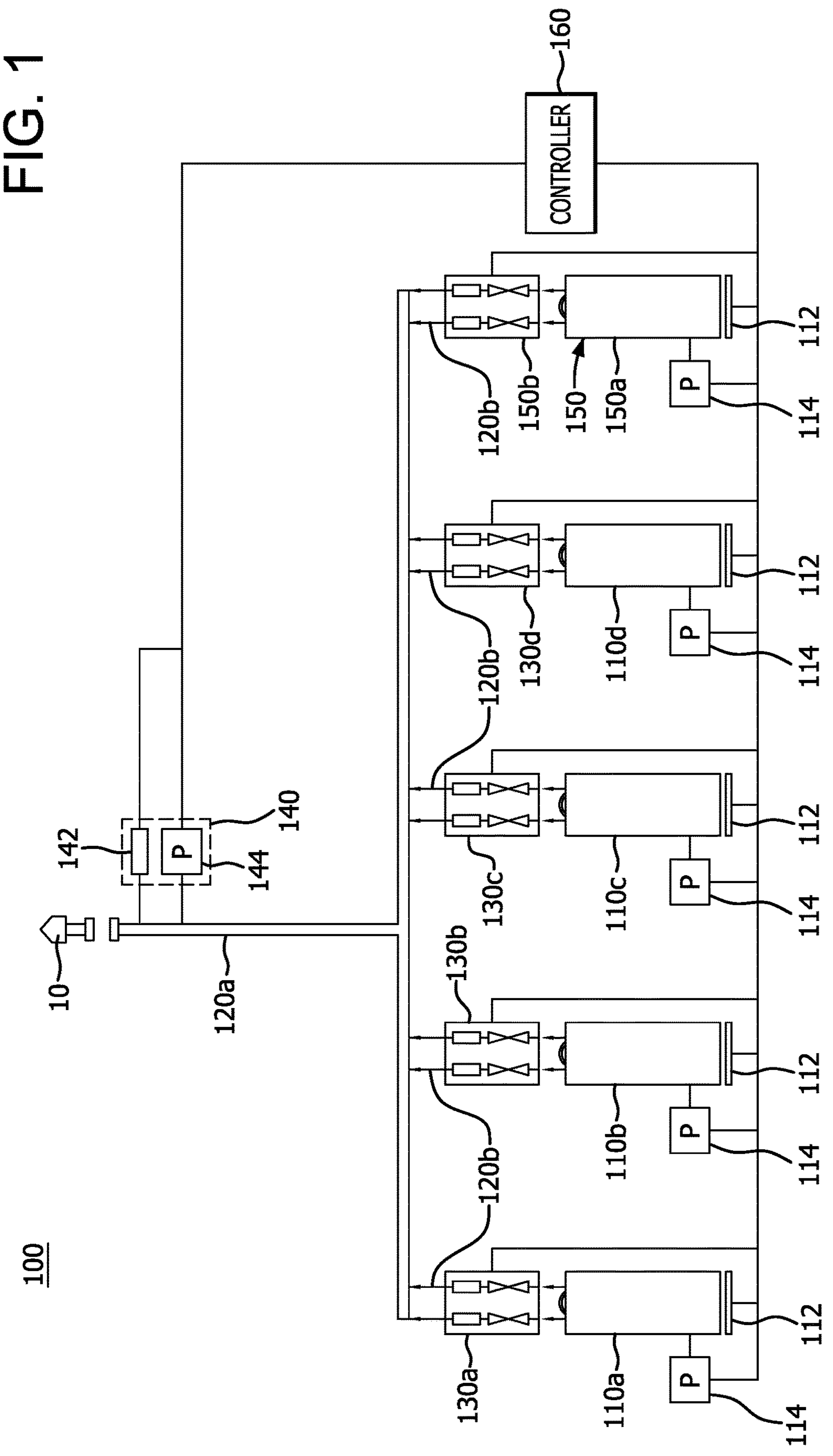
FIG. 1 is a block diagram schematically illustrating the overall configuration of a supply control system for a tank according to an embodiment of the present disclosure.
Figure 2:
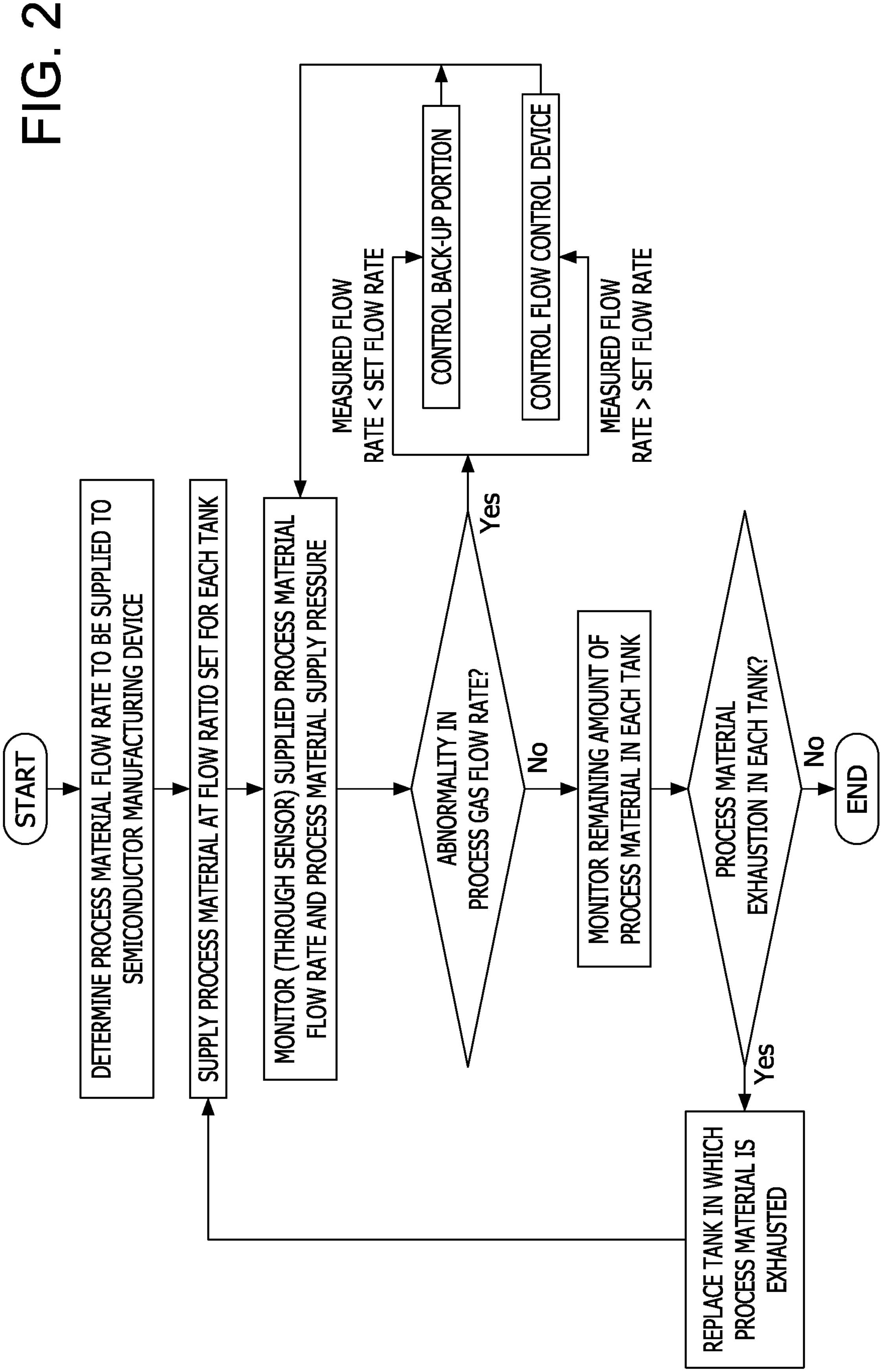
FIG. 2 is a flow chart illustrating a series of processes in which process material stored in a tank is supplied to a semiconductor manufacturing device according to the embodiment of FIG. 1.
Figure 3:
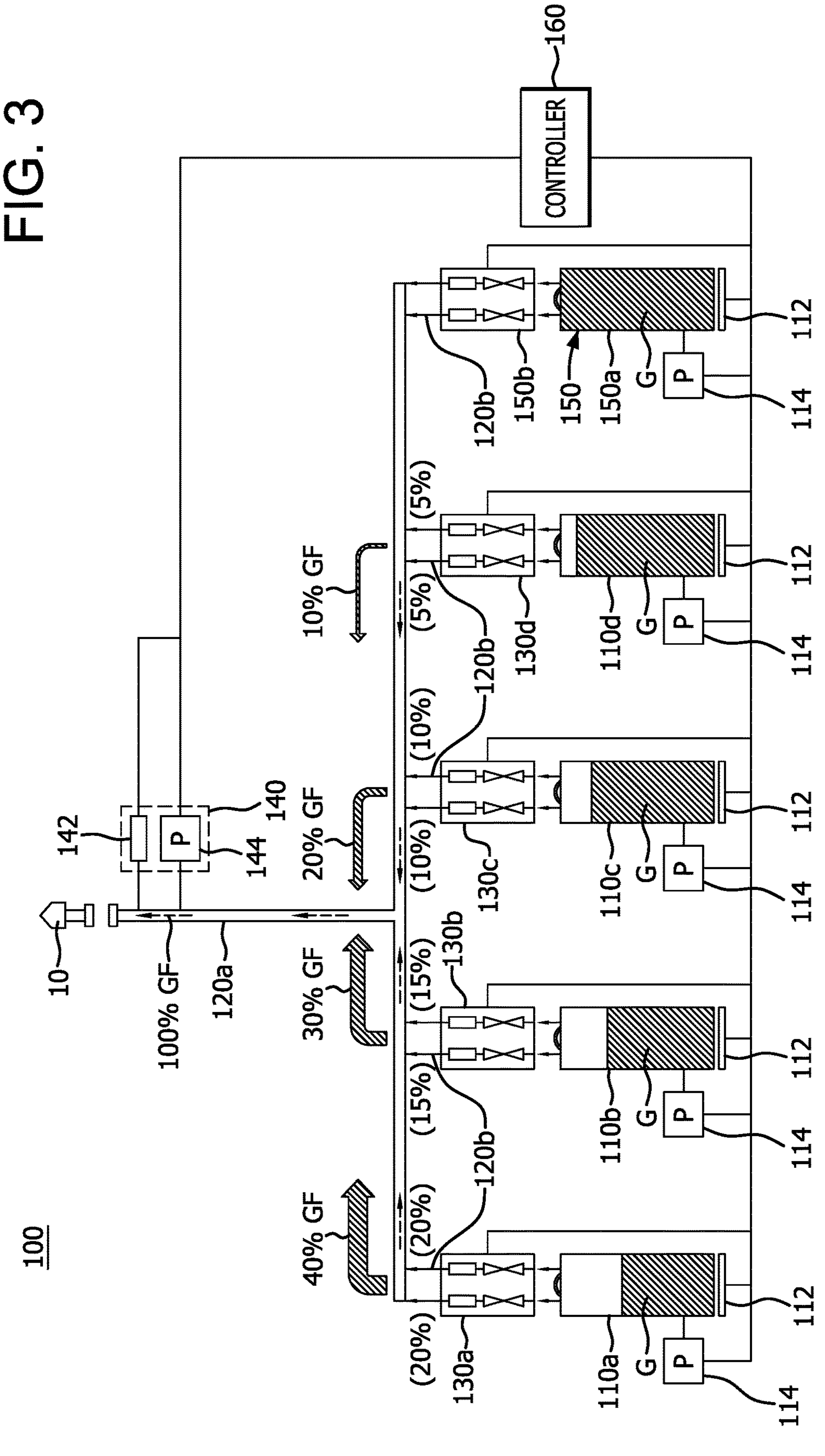
FIG. 3 is a diagram illustrating an operation state in which process material stored in a plurality of tanks is discharged from each of the plurality of tanks at a different flow ratio such that the plurality of tanks is exhausted sequentially according to the embodiment of FIG. 1.
Figure 4:
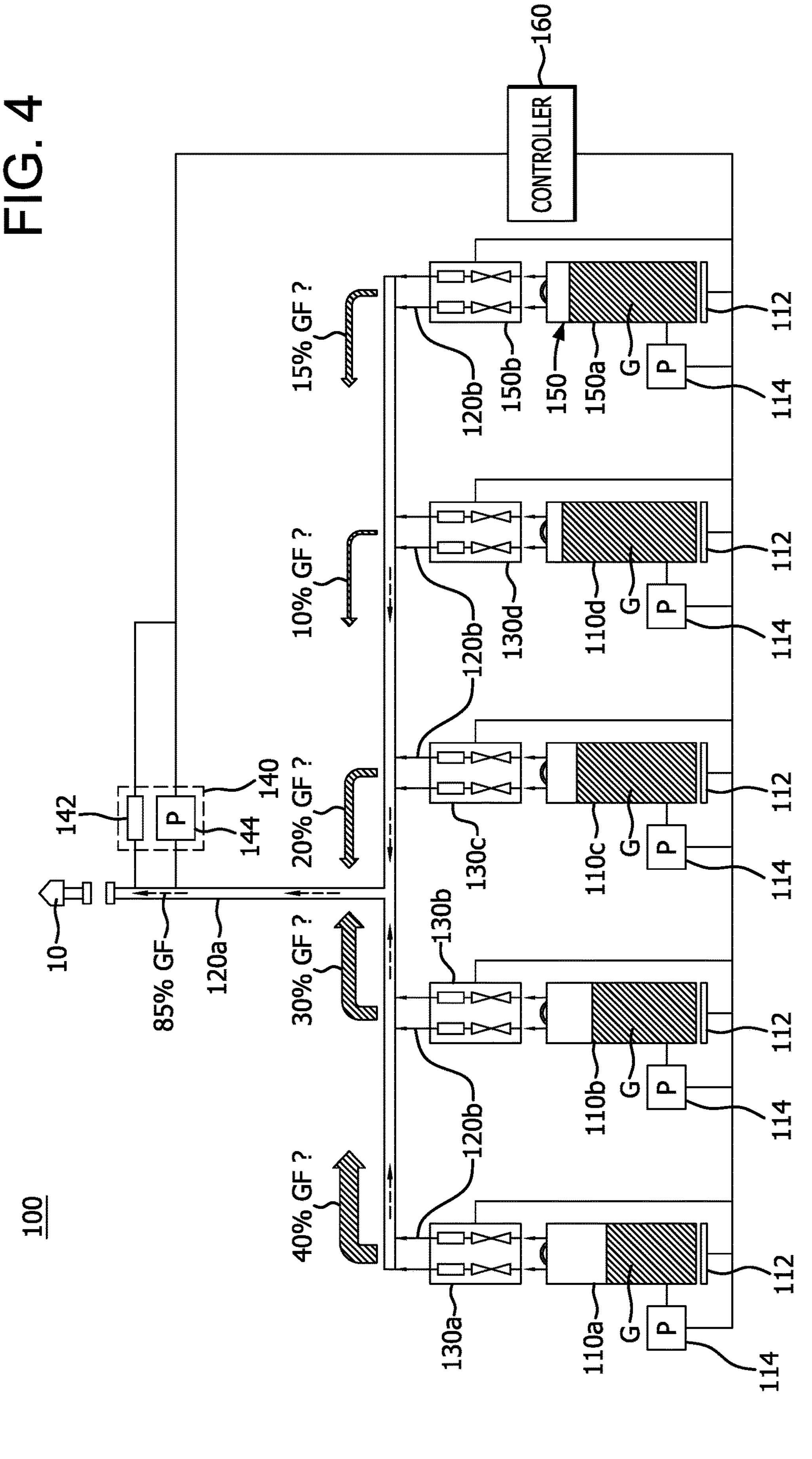
FIG. 4 is a diagram illustrating an operation state of a back-up portion when an abnormality occurs while supplying process material to a semiconductor manufacturing device according to the embodiment of FIG. 3.
Figure 5:
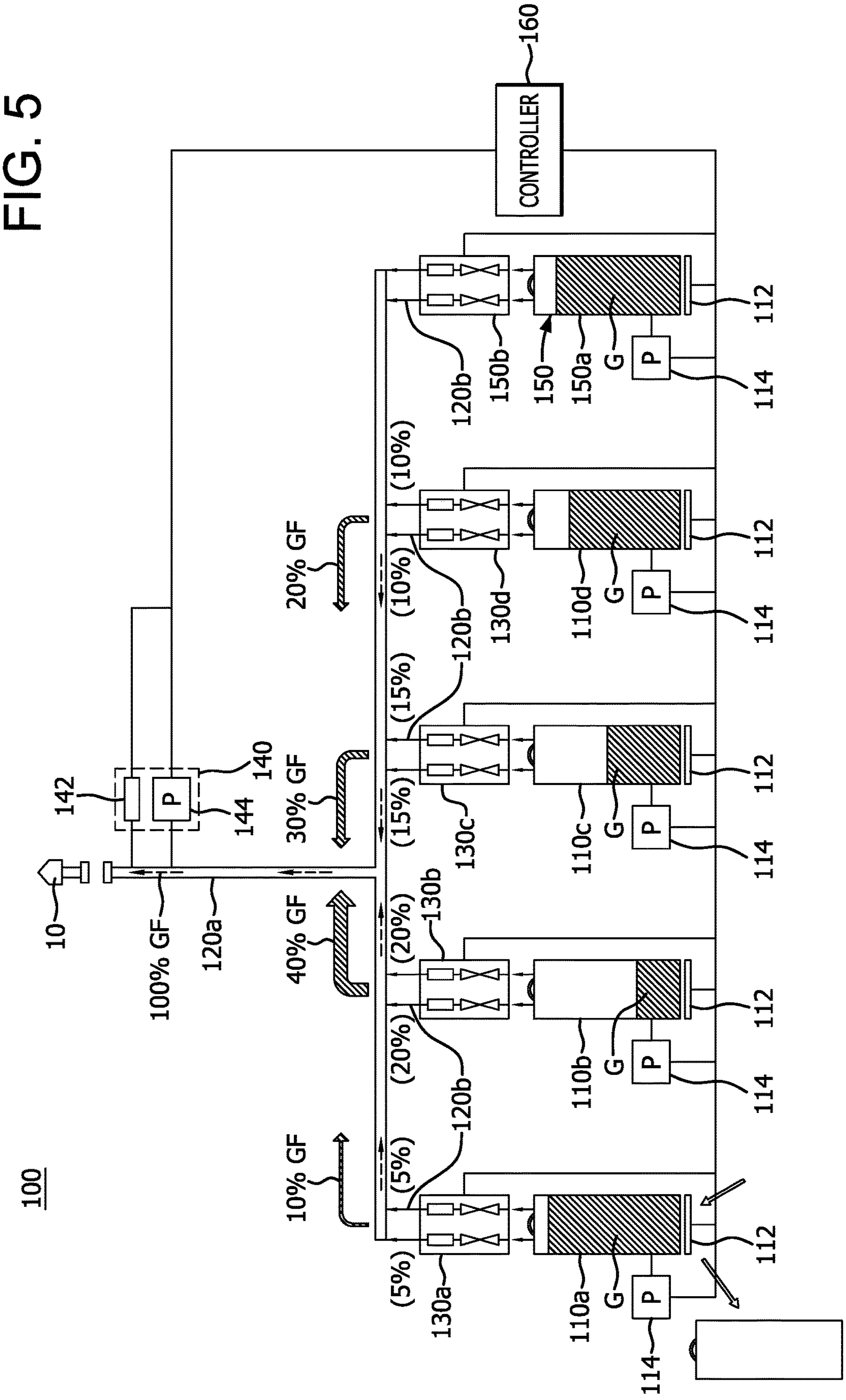
FIG. 5 is a view illustrating an operation state in which process material is transmitted at a changed flow ratio after replacing a tank due to process material supply according to the embodiment of FIG. 3.

FIG. 1 is a block diagram schematically illustrating the overall configuration of a supply control system for a tank according to an embodiment of the present disclosure, FIG. 2 is a flow chart illustrating a series of processes in which process material stored in a tank is supplied to a semiconductor manufacturing device according to the embodiment of FIG. 1, FIG. 3 is a diagram illustrating an operation state in which process material stored in a plurality of tanks illustrated in FIG. 1 is discharged from each of the plurality of tanks at a different flow ratio such that the plurality of tanks are exhausted sequentially, FIG. 4 is a diagram illustrating an operation state of a back-up portion when an abnormality occurs while supplying process material to a semiconductor manufacturing device according to the embodiment of FIG. 3, and FIG. 5 is a view illustrating an operation state in which process material is transmitted at a changed flow ratio after replacing a tank due to process material supply according to the embodiment of FIG. 3.

The terms "over", "under", "left and right", "front", and "rear", and the like, which designate directions in the description and claims of the present disclosure, are not intended to limit the scope of protection of the present disclosure, but are defined based on the relative positions between the drawings and components to facilitate the description, the three axes may be interchanged through rotation to correspond to each other, and this is the case unless specifically limited otherwise.

Since a supply control system 100 for a tank according to an embodiment of the present disclosure is a system that is not applied to a conventional small amount-point supply method for supplying process material G (chemical products) stored in each of the small cylinders to a semiconductor manufacturing device 10 through a supply cabinet, but is applied to a large amount-centralized supply method utilizing a plurality of tanks 110*a*-110*d*, a process material flow rate GF discharged from each of the tanks 110*a*-110*d* may be individually controlled, a replacement cycle of each of the tanks 110*a*-110*d* may be efficiently managed, and even if any one of the tanks 110*a*-110*d* is replaced or an abnormality occurs in a pipe, a fixed amount of process material required for the semiconductor manufacturing device 10 may be stably supplied.

In order to specifically implement the functions and features as described above, the supply control system for the tank according to an embodiment of the present disclosure includes, for example, the plurality of tanks 110*a*-110*d*, a main-supply pipe 120*a*, sub-supply pipes 120*b*, flow control devices 130*a*-130*d*, a sensor 140, a flow meter 142, a back-up portion 150, and a controller 160 as illustrated in FIG. 1, and performs a series of processes illustrated in FIG. 2 such that process material (chemical products) is stably supplied to the semiconductor manufacturing device 10.

Here, the semiconductor manufacturing device 10 may be, for example, a Chemical Vapor Deposition (CVD) device for receiving process material and for chemically depositing a coating material on a surface of a substrate; an etching device for etching deposited portions; or a device for cleaning etched portions.

In the present disclosure, a plurality of tanks having the same storage capacity may be provided to ensure that process material is stably supplied to the semiconductor manufacturing device 10 for a long period of time.

The tanks 110*a*-110*d* may include, for example, an outlet coupled to the sub-supply pipe 120*b* as described below and configured to discharge the stored process material to the outside, a cylindrical structure frame (not shown) for supporting edges, a load cell 112 for estimating the remaining amount of stored process material, and a pressure sensor 114, respectively.

At this time, the load cell 112 may be a component for estimating the remaining amount of the stored process material by measuring the weight of each of the tanks 110*a*-110*d* that change according to discharging of the stored process material, and may be a variety of commercial products which include, for example, a piezoelectric element positioned between an installation surface having the tanks 110*a*-110*d* placed thereon and the tanks 110*a*-110*d*.

Estimation of the remaining amount of the stored process material in each of the tanks 110*a*-110*d* by using the load cell 112 may be made by the controller 160 to be described below, which receives, in real time or at set time intervals, information on the weight of each of the tanks 110*a*-110*d* measured by the load cell 112 under electrical coupling with the load cell 112.

As an example, the controller 160 may estimate the remaining amount of process material in each of the tanks 110*a*-110*d* by calculating, based on the initial weight of each of the tanks 110*a*-110*d* with full process material, the weight ratio between the tanks 110*a*-110*d* which is measured in real time while process material is discharged.

The pressure sensor 114 may be a component for measuring the internal pressure of each of the tanks 110*a*-110*d* capable of changing according to discharging of the stored process material from each of the tanks 110*a*-110*d* in order to estimate complementarily the remaining amount of the stored process material in the tanks 110*a*-110*d* in cooperation with the load cell 112, and may be any of a variety of commercial products for generating a predetermined electrical signal according to the internal pressure of each of the tanks 110*a*-110*d* by being installed to communicate with the internal space of each of the tanks 110*a*-110*d*.

Estimation of the remaining amount of process material in each of the tanks 110*a*-110*d* by using the pressure sensor 114 may be also made by the controller 160 to be described below, which receives, in real time or at predetermined time intervals, information on the pressure between the tanks 110*a*-110*d* which is measured by the pressure cell 114 under electrical coupling with the pressure sensor 114.

As an example, the controller 160 may estimate the remaining amount of process material in each of the tanks 110*a*-110*d* by calculating, based on the initial pressure of each of the tanks 110*a*-110*d* with full process material, the pressure ratio of each of the tanks 110*a*-110*d* measured in real time while process material is discharged.

The main-supply pipe 120*a* may be a component which corresponds to a pipe for coupling the plurality of tanks 110*a*-110*d* to the manufacturing device 10 to ensure that process material discharged from the plurality of tanks 110*a*-110*d* is supplied to the manufacturing device 10. Specifically, as illustrated in FIG. 1, the main-supply pipe 120*a* may provide process material to the semiconductor manufacturing device 10 by communicating with a plurality of sub-supply pipes 120*b*, each coupled to the outlet of each of the plurality of tanks 110*a*-110*d*.

The main-supply pipe 120*a* may include, for example, a plurality of pipes divided into a predetermined length, a plurality of VCRs (fasteners) for hermetically jointing the plurality of pipes, and a regulator and a manual/automatic valve disposed between the plurality of pipes.

The flow control devices 130*a*-130*d* may be components which are provided in each of the sub-supply pipes 120*b* to control the process material flow rate GF discharged from each of the plurality of tanks 110*a*-110*d*, and may operate to control the discharged process material flow rate GF or prevent process material discharge, from the corresponding one of the plurality of tanks 110*a*-110*d* according to control commands from the controller 160 under electrical coupling with the controller 160.

The plurality of flow control devices 130*a*-130*d* may be commercial electronic control valves which are implemented in various ways, such as by changing a cross-sectional size, that is, an opening rate, of the pipe through which a fluid such as process material flows, or by variably forming a bypass pipe.

On the other hand, it is preferable that the above-described flow control devices 130*a*-130*d* are commercial products integrated with a flow meter 142 for measuring the process material flow rate GF flowing through the sub-supply pipe 120*b*, and are configured to transmit information on the corresponding process material flow rate GF to the controller 160. This is to check whether the process material corresponding to specific flow rate is discharged when the process material in each of the tanks 110*a*-110*d* is set to and discharged at different flow rates, as illustrated in FIG. 3.

The sensor 140 may be a component which is provided in the main-supply pipe 120*a* to check whether the process material flow rate GF required for the semiconductor manufacturing device 10 is accurately supplied from each of the tanks 110*a*-10*d*, and may operate to measure in real time the process material flow rate GF and the process material supply pressure actually supplied to the semiconductor manufacturing device 10 through the main-supply pipe 120*a* by controlling the flow control devices 130*a*-130*d* as described above.

As illustrated in FIG. 1, the sensor 140 may include, for example, the flow meter 142 for measuring the amount of process material flowing into the semiconductor manufacturing device 10 through the main-supply pipe 120*a*, and a pressure sensor 144 for measuring the internal pressure of the main-supply pipe 120*a* to complementarily estimate whether there is an abnormality in the process material flow rate GF in cooperation with the flow meter 142.

At this time, the flow meter 142 may be, for example, any of various types of commercial products which, for example, use a differential pressure, use an area, use an electronic method, or use ultrasonic, and the pressure sensor 144 may be any of various types of commercial products which generate a predetermined electrical signal according to the internal pressure of the main-supply pipe 120*a* as described above.

Both the information on the process material flow rate GF measured by the flow meter 142 and the information on the process material supply pressure measured by the pressure sensor 144, as described above, may be transmitted to the controller 160, and may be utilized to determine a malfunction or failure of the flow control devices 130*a*-130*d* or a process material leakage from, for example, a pipe connection.

The back-up portion 150 may be a component which is provided to stably supply process material to the semiconductor manufacturing device 10, and may include, for example, a back-up tank 150*a*, a flow control device 150*b*, and a load cell 152, and a pressure sensor 154 as illustrated in FIG. 1.

Here, the back-up tank 150*a* may be a component for discharging the stored process material when there is an abnormality in supplying process material to the semiconductor manufacturing device 10 and may be installed to communicate with the main-supply pipe 120*a* while having process material stored therein, as in the tanks 110*a*-110*d*.

At this time, the storage capacity of the back-up tank 150*a* may be the same as those of the tanks 110*a*-110*d*, and may be appropriately changed taking into account, for example, the number of tanks 110*a*-110*d* and the process material flow rate GF supplied to the semiconductor manufacturing device 10, if necessary.

The flow control device 150*b* is a component for controlling the process material flow rate GF discharged from the back-up tank 150*a*, the load cell 152 is a component for measuring the weight of the back-up tank 150*a*, and the pressure sensor 154 is a component for sensing the internal pressure of the back-up tank 150*a*. The above components may have the same configuration as the flow control devices 130*a*-130*d*, the load cell 112, and the pressure sensor 114 as described above, except for what they are installed on.

The back-up portion 150 may be electrically coupled to the controller 160, and may selectively and supplementally discharge the stored process material to the main-supply pipe 120*a* through the flow control device 150*b* according to the determination and operation control by the controller 160. As a result, the back-up portion 150 may stably supply the set fixed amount of process material flow rate GF to the semiconductor manufacturing device 10.

On the other hand, the load cell 152 and the pressure sensor 154 included in the back-up portion 150 may be provided to estimate the remaining amount of process material stored in the back-up tank 150*a*, respectively, as in the tanks 110*a*-110*d*.

The controller 160 may be a component which is electrically connected to, for example, the load cells 112, 152 and the pressure sensors 114, 144, 154 of the tanks 110*a*-110*d*, the flow control devices 130*a*-130*d*, the sensor 140, and the back-up portion 150, respectively, applies control power and signals to these components to control their operation, and receives and processes measured information or data. The controller 160 may include, for example, a modular information processing unit such as a micro controller unit (MCU), a microcomputer, an Arduino, or a Programmable Logic Control (PLC); a display (not shown) for communicating, for example, processed information; and an input device (not shown) for user setting.

A series of processes and algorithms, which may allow the controller 160 to control each of the components coupled thereto and may process transmitted and received data and the like, may be coded in a programming language, such as C, C++, JAVA, and machine language, which is readable by the information processing unit.

At this time, the coded algorithms for a series of operations and data processes performed by the controller 160 may be made in various ways and forms by those skilled in the art, and thus detailed descriptions thereof will be omitted.

However, reference to FIGS. 2-5 will be made below to explain what series of control operations are used by the controller 160 according to an embodiment of the present disclosure to stably supply and manage the set process material flow rate GF from the plurality of tanks 110*a*-110*d* to the semiconductor manufacturing device 10.

First, as illustrated in FIG. 2, the controller 160 receives, through an input device, information on the process material flow rate GF to be continuously supplied to the semiconductor manufacturing device 10 and stores the received information. At this time, the process material flow rate GF to be continuously supplied to the semiconductor manufacturing device 10 may be set or determined by an operator taking into account, for example, an overall scale or an operation situation of the semiconductor manufacturing device 10.

As an example, when the process material flow rate GF supplied daily for a week is 55, 50, 60, 55, 55, 55 (in units of GPM or LPM) respectively, the final process material flow rate GF to be supplied may be set as 65.14=54.28 (average value)×1.2 (safety factor) (see 100% GF in FIG. 3).

As described above, the process material flow rate GF set to be supplied to the semiconductor manufacturing device 10 is a set value that may be converted into a corresponding process material supply pressure and arbitrarily changed according to circumstances, and hence may be used as a reference for the control operation by the controller 160 (S100).

Next, when the process material flow rate GF to be continuously supplied to the semiconductor manufacturing device 10 is set, the controller 160 controls each of the flow control devices 130*a*-130*d* according to the flow ratio of each of the tanks 110*a*-110*d* such that process material is supplied to the semiconductor manufacturing device 10, as illustrated in FIG. 2.

At this time, when four tanks, that is, the first, second, third, and fourth tanks 110*a*-110*d* are provided as illustrated in FIG. 3, assuming that the process material flow rate GF previously set to be supplied to the semiconductor manufacturing device 10 is 100%, each of the tanks 110*a*-110*d* may be set to supply process material at a ratio of 40%, 30%, 20%, and 10%, respectively.

As described above, discharging process material stored in each of the four tanks 110*a*-110*d* at different flow rates is to allow the tanks 110*a*-110*d* to experience exhaustion of process material and replacement, not simultaneously but sequentially.

Since the tanks 110*a*-110*d* are sequentially replaced, process material may be efficiently and stably supplied to the semiconductor manufacturing device 10 without interruption, and the plurality of tanks 110*a*-110*d* may be efficiently maintained.

The controller 160 controls the plurality of flow control devices 130*a*-130*d* to operate at different opening rates, such that the flow ratio of each of the tanks 110*a*-110*d* set as described above may be reflected (S200).

Next, as illustrated in FIG. 2, the controller 160 measures and monitors, through the sensor 140, the process material flow rate GF and the process material supply pressure supplied to the semiconductor manufacturing device 10 through the main-supply pipe 120*a*. At this time, the measurement by the sensor 140 may be performed in real time or at regular time intervals under the control of the controller 160 (S300).

Next, as illustrated in FIG. 2, in the process of monitoring the process material flow rate GF and the process material supply pressure measured as being supplied to the semiconductor manufacturing device 10 through the main-supply pipe 120*a*, the controller 160 determines whether an abnormality exists, that is, whether the measured process material flow rate GF (or the measured process material supply pressure) is the same as the set process material flow rate GF (or the set process material supply pressure) within a predetermined range.

Here, the predetermined range may be changed according to the manufacturing process situation or the operation on-site, and may generally be determined within a range of 5% to 10% based on the process material flow rate GF (or the process material supply pressure) set to be supplied to the semiconductor manufacturing device 10.

First, in this step, when the controller 160 determines that the measured process material flow rate GF (or the measured process material supply pressure) is lower than the set process material flow rate GF (the set process material supply pressure) by a predetermined range or more, the controller 160 controls the operation of the back-up portion 150 as illustrated in FIG. 4. That is, the controller 160 controls the back-up portion 150 to open the flow control device 150*b* such that the process material flow rate GF corresponding to a shortage (see 15% GF in FIG. 4) is supplemented to the main supply pipe 120*a* by the back-up tank 150*a*.

When there is a shortage (see 15% GF in FIG. 4) of the measured process material flow rate GF (the measured process material supply pressure) based on the set process material flow rate GF (the set process material supply pressure), this control for the back-up portion 150 is performed immediately.

However, subsequently, when the shortage of the process material flow rate GF is not temporary and persists for a predetermined period of time or more (for example, 1 minute), the controller 160 cancels the control described above for the back-up portion 150, and switches to the control for increasing the opening rate of each of the flow control devices 130*a*-130*d* provided in each of the tanks 110*a*-110*d* such that the process material flow rate GF corresponding to the shortage (see 15% GF in FIG. 4) is supplemented to the main-supply pipe 120*a*.

Here, increasing of the opening rate of each of the flow control devices 130*a*-130*d* provided in each of the tanks 110*a*-110*d* may be made for all flow control devices 130*a*-130*d* at the ratios 4:3:2:1 corresponding to the flow ratio 40%, 30%, 20%, 10% of the tanks 110*a*-110*d* at the same time. When process material exhaustion of a specific one of the tanks 110*a*-110*d* is preferentially required, the control may be performed for increasing the opening rate of only one of the flow control devices 130*a*-130*d* that corresponds to the specific one of the tanks 110*a*-110*d*.

The shortage of process material flow rate GF as described above may occur due to various factors, such as a temporary delay occurring in the semiconductor manufacturing device 10, an incorrect fastening in the connection of the main-supply pipe 120*a* or the sub-supply pipe 120*b*, an internal problem of the tanks 110*a*-110*d*, and a temperature change of the surrounding environment (S410).

On the contrary, in this step, when the controller 160 determines that the measured process material flow rate GF (or the measured process material supply pressure) is greater than the set process material flow rate GF (the set process material supply pressure) by a predetermined range or more, the controller 160 controls each of the flow control devices 130*a*-130*d* provided in each of the tanks 110*a*-110*d*.

That is, the controller 160 reduces the opening rate of each of the flow control devices 130*a*-130*d* provided in each of the tanks 110*a*-110*d*, such that the process material flow rate GF from the tanks 110*a*-110*d* is fundamentally prevented from being excessively discharged to the main-supply pipe 120*a*.

Here, reducing the opening rate of each of the flow control devices 130*a*-130*d* provided in each of the tanks 110*a*-110*d* may be made for all flow control devices 130*a*-130*d* at the ratios 4:3:2:1 corresponding to the flow ratio 40%, 30%, 20%, 10% of the tanks 110*a*-110*d* at the same time. When process material exhaustion of a specific one of the tanks 110*a*-110*d* needs to be suppressed, the control may be performed for reducing the opening rate of only one of the flow control devices 130*a*-130*d* that corresponds to the specific one of the tanks 110*a*-110*d*.

Over-supply of process material flow rate GF as described above may also occur due to various factors, such as a working situation occurring in the semiconductor manufacturing device 10, an incorrect fastening in the connection of the main-supply pipe 120*a* or the sub-supply pipe 120*b*, an internal problem of the tanks 110*a*-110*d*, and a temperature change of the surrounding environment (S420).

When supplementation and control of the process material flow rate GF as described above are performed, the controller 160 also measures, through the sensor 140, the process material flow rate GF and the process material supply pressure supplied to the semiconductor manufacturing device 10 through the main-supply pipe 120*a*, and thereby monitors whether the supplementation and control of the process material flow rate GF is normally achieved (S400).

Next, as illustrated in FIG. 2, the controller 160 estimates or calculates the remaining amount of process material in each of the plurality of tanks 110*a*-110*d* by receiving, in real time or at a predetermined time intervals, information on the weight and information on the internal pressure of each of the plurality of tanks 110*a*-110*d* that are measured respectively by the load cell 112 and the pressure sensor 114 installed in each of the plurality of tanks 110*a*-110*d*, and then continues to monitor the remaining amount of process material in each of the plurality of tanks 110*a*-110*d* (S500).

At this time, the remaining amount of process material estimated using the load cell 112 may be estimated by comparing the weight of each of the tanks 110*a*-110*d* measured in real time while process material is being discharged with the initial weight of each of the tanks 110*a*-110*d* measured when process material is completely filled therein, and by calculating as the ratio obtained by applying a predetermined parameter to the compared result.

In addition, the remaining amount of process material estimated using the pressure sensors 114, 154 may be estimated by comparing the pressure of each of the tanks 110*a*-110*d* measured in real time while process material is being discharged with the initial pressure of each of the tanks 110*a*-110*d* measured when process material is completely filled therein, and by calculating as the ratio obtained by applying a predetermined parameter to the compared result.

Next, as illustrated in FIGS. 2 and 5, the controller 160 determines whether process material in the specific tank 110*a* is exhausted while monitoring the remaining amount of process material of each of the tanks 110*a*-110*d* (S600).

At this time, when it is determined that process material in the specific tank 110*a* is exhausted, the controller 160 may perform the operation required to allow replacement of the specific tank 110*a*. As an example, the controller 160 may transmit a signal or notification for notifying a central system (not shown) or a responsible worker who operates the semiconductor manufacturing device 10 of the need to replace the specific tank 110*a* (S610).

While the specific tank 110*a* (the first tank) is being replaced in response to this replacement signal or notification from the controller 160, the controller 160 additionally controls the remaining semiconductor manufacturing devices 10 such that each of the remaining semiconductor manufacturing devices 10 maintains the set process material flow rate GF.

Here, the additional control by the controller 160 may be achieved by controlling the back-up portion 150 such that process material is supplemented by the back-up portion 150.

At this time, the controller 160 controls the flow control device 150*b* of the back-up tank 150*a* such that the back-up tank 150*a* discharges, into the main-supply pipe 120*a*, the process material flow rate GF (for example, 40% GF) corresponding to the process material flow ratio (for example, see 40% GF in FIG. 3) that was previously being supplied by the tank 110*a* (the first tank) that is being replaced.

In addition, unlike the above, the additional control by the controller 160 may be achieved by controlling the remaining tanks 110*b*-110*d* such that process material is supplemented by the remaining tanks 110*b*-110*d* excluding the tank 110*a* (the first tank) that is being replaced.

At this time, the controller 160 increases the opening rate of the specific one of the flow control devices 130*b*-130*d* such that the specific one of the remaining tanks 110*b*-110*d* discharges, into the main-supply pipe 210*a*, the process material flow ratio (for example, see 40% GF in FIG. 3) that was previously being supplied by the tank 110*a* (the first tank) that is being replaced. This discharge may be achieved by allocating an additional flow ratio (referring to FIG. 3, sequentially, additional 20% GF for 30% GF, additional 13.3% GF for 20% GF, additional 6.7% for 10% GF) to each of the remaining tanks 110*b*-110*d* based on the allocated flow ratio of each of the remaining tanks 110*b*-110*d* (see 30% GF, 20% GF, 10% GF in FIG. 3).

Finally, when the replacement of the tank 110*a* (the first tank) is completed, as illustrated in FIGS. 2 and 5, the controller 160 controls each of the flow control devices 130*a*-130*d* according to the predetermined flow ratio of each of the tanks 110*a*-110*d* such that process material is supplied to the semiconductor manufacturing device 10.

At this time, as illustrated in FIG. 5, unlike in FIG. 3 described above, when four tanks 110*a*-110*d*, that is, first, second, and fourth tanks 110*a*-110*d* are provided, the determined flow ratio of each of the tanks 110*a*-110*d* may be changed by the controller 160 such that process material in the remaining tanks 110*b*-110*d*, excluding the replaced first tank 110*a*, is exhausted sequentially.

That is, the controller 160 controls each of the flow control devices 130*a*-130*d* such that the first, second, third, and fourth tanks 110*a*-110*d* discharge the process material flow rate GF of 10%, 40%, 30%, and 20%, respectively, based on the process material flow rate GF (100% GF) set or determined to be supplied to the semiconductor manufacturing device through the main-supply pipe 120*a*.

As described above, discharging process material stored in each of the four tanks 110*a*-110*d* at the changed flow rate, unlike in FIG. 3, is to prevent two or more of the four tanks 110*a*-110*d* from being replaced at the same time. As a result, since the tanks 110*a*-110*d* may experience exhaustion of process material and replacement, not simultaneously but sequentially, process material may be efficiently and stably supplied to the semiconductor manufacturing device 10 without interruption.

Reflection of the changed flow ratio of each of the tanks 110*a*-110*d* as described above may be achieved by the controller 160 controlling the plurality of flow control devices 130*a*-130*d* such that the plurality of flow control devices 130*a*-130*d* operate at different opening rates, and the subsequent processes may be continuously performed through the repetition of the above-described processes as illustrated in FIG. 2.

Since the supply control system 100 for the tank of the present disclosure is operated according to a series of control operations of the controller 160 as described above, for example, the problem of process material discharge imbalance due to the difference in the internal pressure between the plurality of tanks 110*a*-110*d*, and the problem of process material quality in some of the tanks 110*a*-110*d* due to long-term non-use or low use can be effectively addressed.

While the present disclosure has been explained in relation to its preferred embodiments, it is to be understood that various modifications thereof will become apparent to those skilled in the art upon reading the specification. Therefore, it is to be understood that the disclosure disclosed herein is intended to cover such modifications or variations as fall within the scope of the appended claims.

DESCRIPTION OF SYMBOLS

10: semiconductor manufacturing device
G: process material
GF: process material flow rate
100: supply control system for tank
110*a*-110*d*: tank, that is, first, second, third and fourth tanks
112, 152: load cell
114, 144, 154: pressure sensor
120*a*: main-supply pipe
120*b*: sub-supply pipe
130*a*-130*d*: flow control device
140: sensor
142: flow meter
150: back-up portion
150*a*: back-up tank
150*b*: flow control device
160: controller

What is claimed is:

1. A supply control system for a tank, comprising:

a plurality of tanks for storing a large amount of process material used to manufacture a semiconductor;

a main-supply pipe configured to communicate with sub-supply pipes respectively coupled to the plurality of tanks and to supply process material to a semiconductor manufacturing device;

a plurality of flow control devices respectively included in the sub-supply pipes and configured to control a process material flow rate discharged from each of the plurality of tanks;

a sensor included in the main-supply pipe and configured to measure in real time the process material flow rate and a process material supply pressure supplied from each of the plurality of tanks to the semiconductor manufacturing device;

a back-up portion coupled to the main-supply pipe and configured to supplementally discharge the stored process material, such that process material is stably supplied to the semiconductor manufacturing device; and a controller configured to control the plurality of flow control devices and the back-up portion based on information on the process material flow rate or information on the process material supply pressure measured by the sensor, such that a set process material flow rate is supplied to the semiconductor manufacturing device through the main-supply pipe;

wherein the controller is configured to control the plurality of flow control devices to operate at different opening rates, such that process material stored in the plurality of tanks is discharged from the plurality of tanks at a different flow ratio and the plurality of tanks are exhausted sequentially; and wherein the controller is configured to control the back-up portion to supplementally supply process material when there is an abnormality in the information on the process material flow rate and the information on the process material supply pressure measured by the sensor.

2. The supply control system for the tank of claim 1, wherein the plurality of tanks and the back-up portion include at least one of a load cell or a pressure sensor to estimate the remaining amount of stored process material, the load cell being configured to measure the weight of each of the plurality of tanks and the back-up portion that changes according to discharging of stored process material, and the pressure sensor being configured to measure the internal pressure of each of the plurality of tanks and the back-up portion that changes according to discharging of stored process material.

3. The supply control system for the tank of claim 1, wherein the controller is configured to control the back-up portion to supplementally supply process material while a specific one of the plurality of tanks is being replaced according to sequential process material exhaustion of the plurality of tanks.

4. The supply control system for the tank of claim 1, wherein when the plurality of tanks comprise a first tank, a second tank, a third tank, and a fourth tank, the controller is configured to control, based on the process material flow rate set to be supplied to the semiconductor manufacturing device through the main-supply pipe, each of the plurality of flow control devices such that the first, second, third, and fourth tanks discharge 40%, 30%, 20%, and 10% of process material flow rate, respectively.

5. The supply control system for the tank of claim 4, wherein the controller is configured to control, based on the process material flow rate set to be supplied to the semiconductor manufacturing device through the main-supply pipe, each of the plurality of flow control devices such that the first, second, third, and fourth tanks discharge 10%, 40%, 30%, and 20% of process material flow rate, respectively, when the replacement of the first tank is completed according to the exhaustion of process material stored in the first tank.

* * * * *